(12) United States Patent
Yang et al.

(10) Patent No.: US 9,059,457 B2
(45) Date of Patent: *Jun. 16, 2015

(54) THIN BATTERY

(71) Applicant: UER Technology Corporation, Miaoli County (TW)

(72) Inventors: Chung-Da Yang, Miaoli County (TW); Ray-Tang Sun, Miaoli County (TW)

(73) Assignee: UER Technology Corporation, Miaoli County (TW)

( * ) Notice: Subject to any disclaimer, the term of this patent is extended or adjusted under 35 U.S.C. 154(b) by 339 days.

This patent is subject to a terminal disclaimer.

(21) Appl. No.: 13/708,664

(22) Filed: Dec. 7, 2012

(65) Prior Publication Data

US 2014/0093750 A1   Apr. 3, 2014

(30) Foreign Application Priority Data

Oct. 3, 2012   (TW) .............................. 101219122 U

(51) Int. Cl.
  *H01M 2/30* (2006.01)
  *H01M 10/42* (2006.01)
  *H01M 2/02* (2006.01)

(52) U.S. Cl.
  CPC .............. *H01M 2/30* (2013.01); *H01M 2/0202* (2013.01); *H01M 2/0212* (2013.01); *H01M 2/0207* (2013.01); *H01M 2/0217* (2013.01); *H01M 2/0267* (2013.01); *H01M 10/4257* (2013.01)

(58) Field of Classification Search
  CPC ....... H01M 2/0212; H01M 2/30; H01M 2/02; H01M 2/0202
  USPC ....................................................... 429/7, 162
  See application file for complete search history.

(56) References Cited

U.S. PATENT DOCUMENTS 8,678,849 B2 *  3/2014  Yang et al. ................... 439/374
  2012/0045666 A1 *  2/2012  Kwak et al. ....................... 429/7

* cited by examiner

*Primary Examiner* — Stewart Fraser
*Assistant Examiner* — Rachel Zhang
(74) *Attorney, Agent, or Firm* — Muncy, Geissler, Olds & Lowe, P.C.

(57) ABSTRACT

A thin battery integrating an electric connector and a battery cell is provided, including a battery cell, a circuit board, an electric connector, and an adhesive tape. The battery cell includes a top sealing area, a first electrode bar, and a second electrode bar. The first electrode bar and the second electrode bar are disposed in the top sealing area of the battery cell. The circuit board is disposed in the top sealing area and includes a first and a second electrode welding pad. The electric connector is disposed in the top sealing area and connected electrically to the circuit board. The adhesive tape wraps the battery cell and the circuit board. The thin battery can be connected to the mobile electronic equipment, having a mating connector, along a first direction or a second direction through the electric connector, thereby supplying power.

8 Claims, 7 Drawing Sheets

THIN BATTERY

CROSS-REFERENCES TO RELATED APPLICATIONS

This non-provisional application claims priority under 35 U.S.C. §119(a) on Patent Application No. 101219122 filed in Taiwan, R.O.C. on 2012 Oct. 3, the entire contents of which are hereby incorporated by reference.

BACKGROUND

1. Technical Field

The present disclosure relates to a battery, and in particular, to a thin battery including an electric connector.

2. Related Art

In recent years, smart phones or tablet computers have been developing at a tremendous pace. Customers rush to buy new types of products as soon as the products are launched on the market. Smart phones and tablet computers deeply influence daily life of the public, and even change consumers' social activities. For example, current smart phones and tablet computers on the market have 3G and WiFi functions. Through vigorous promotion by telecom carriers and consumer electronics providers, internet searching and web browsing at any time and any place have become an indispensable part of life for many people. This changes the original internet access manner (limited to only in a room or some specific places), so that people access information conveniently in real time.

The internet access capability and powerful multimedia play capability are major attractions for consumers, but are not their only concern. Most consumers also require a portable electric device to be light and thin, apart from having the other advantages. To make a light and thin electronic device that has functions almost the same as a personal computer, in addition to improvement in the integrated circuit (IC) technology, improvement of an energy density of the battery is also important. The energy density is the amount of energy that per unit volume or mass of a battery can provide. Therefore, if the volume and mass of the battery are reduced without reducing the battery capacity, the energy density of the battery can be effectively increased, which facilitates the application of the battery on portable electronic devices. Currently, lithium batteries are most widely used on portable electronic devices.

A lithium battery is connected to a circuit board through welding to reduce the size of the lithium battery, which makes rework impossible or difficult. Therefore, it is necessary to find an alternative solution.

SUMMARY

The present disclosure provides a thin battery, including a battery cell, a circuit board, an electric connector, and an adhesive tape.

The battery cell includes a top sealing area, a first electrode bar, and a second electrode bar. The first electrode bar and the second electrode bar are disposed in the top sealing area of the battery cell. The circuit board is disposed in the top sealing area and includes a first electrode welding pad and a second electrode welding pad. The electric connector is disposed in the top sealing area and connected electrically to the circuit board. The adhesive tape is provided with an opening and wraps the battery cell and the circuit board such that the electric connector is exposed from the opening.

The first electrode bar is welded on the first electrode welding pad, and the second electrode bar is welded on the second electrode welding pad.

In the present disclosure, the electric connector and the battery cell are integrated as a whole, so that the thin battery can be connected to electronic equipment provided with a mating connector mating with the electric connector directly through the electric connector. In addition, the battery cell is not additionally covered by a case, therefore reducing an overall thickness. The present disclosure is further described in detail below through embodiments and accompanying drawings.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1:
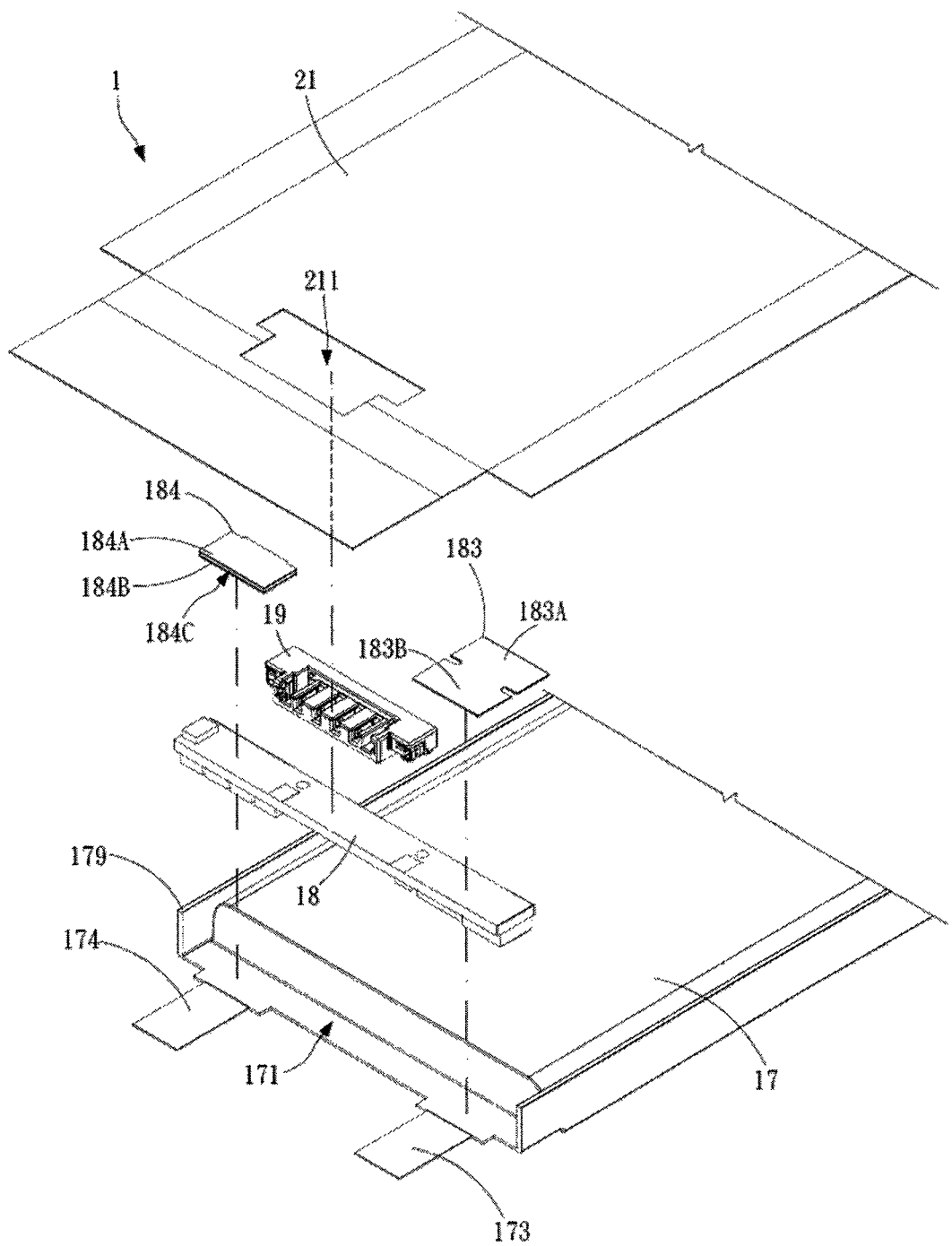
FIG. 1 is a first schematic view of a first embodiment of the present disclosure.
Figure 2:
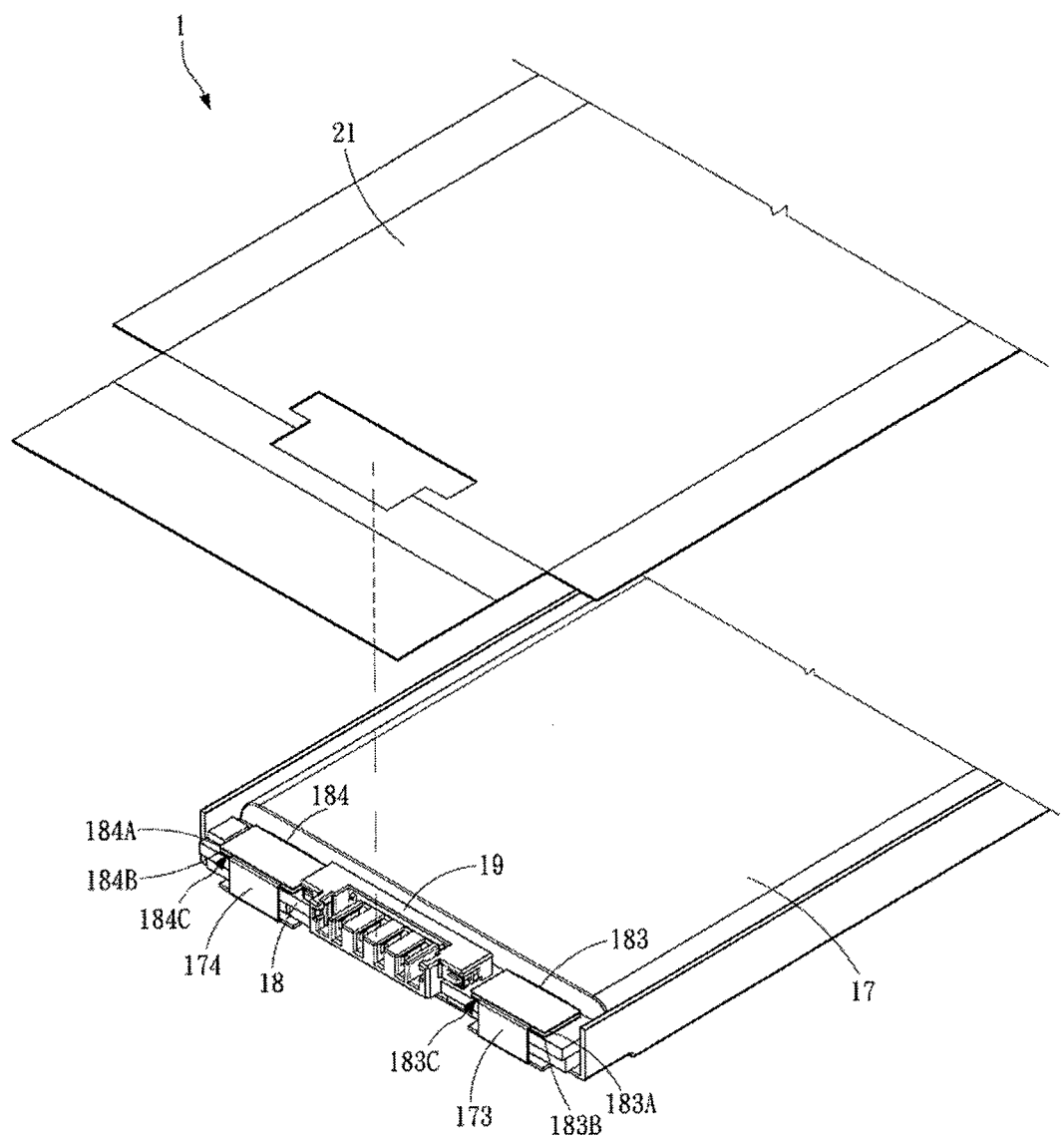
FIG. 2 is a second schematic view of a first embodiment of the present disclosure.
Figure 3:
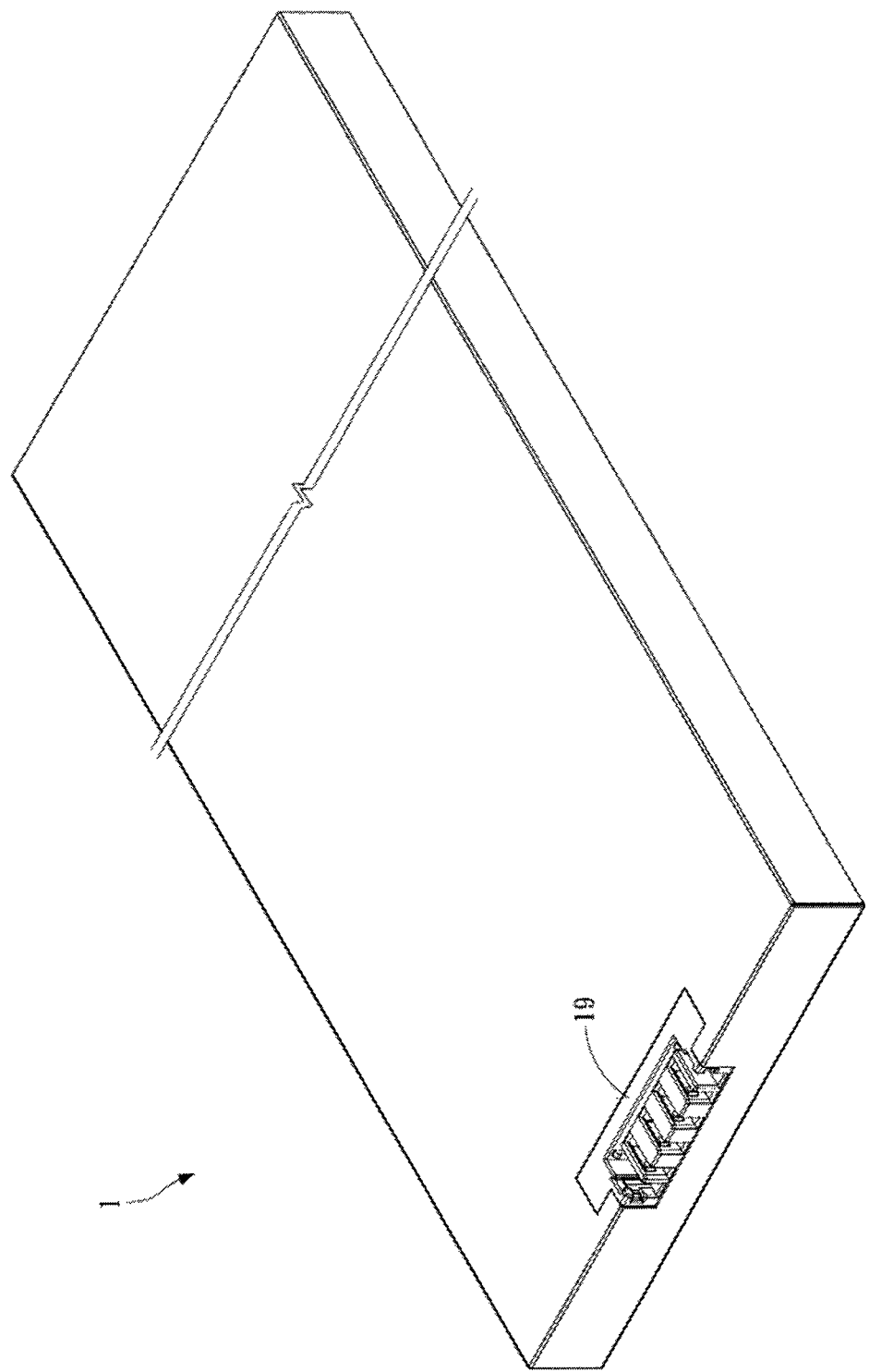
FIG. 3 is a third schematic view of a first embodiment of the present disclosure.
Figure 4:
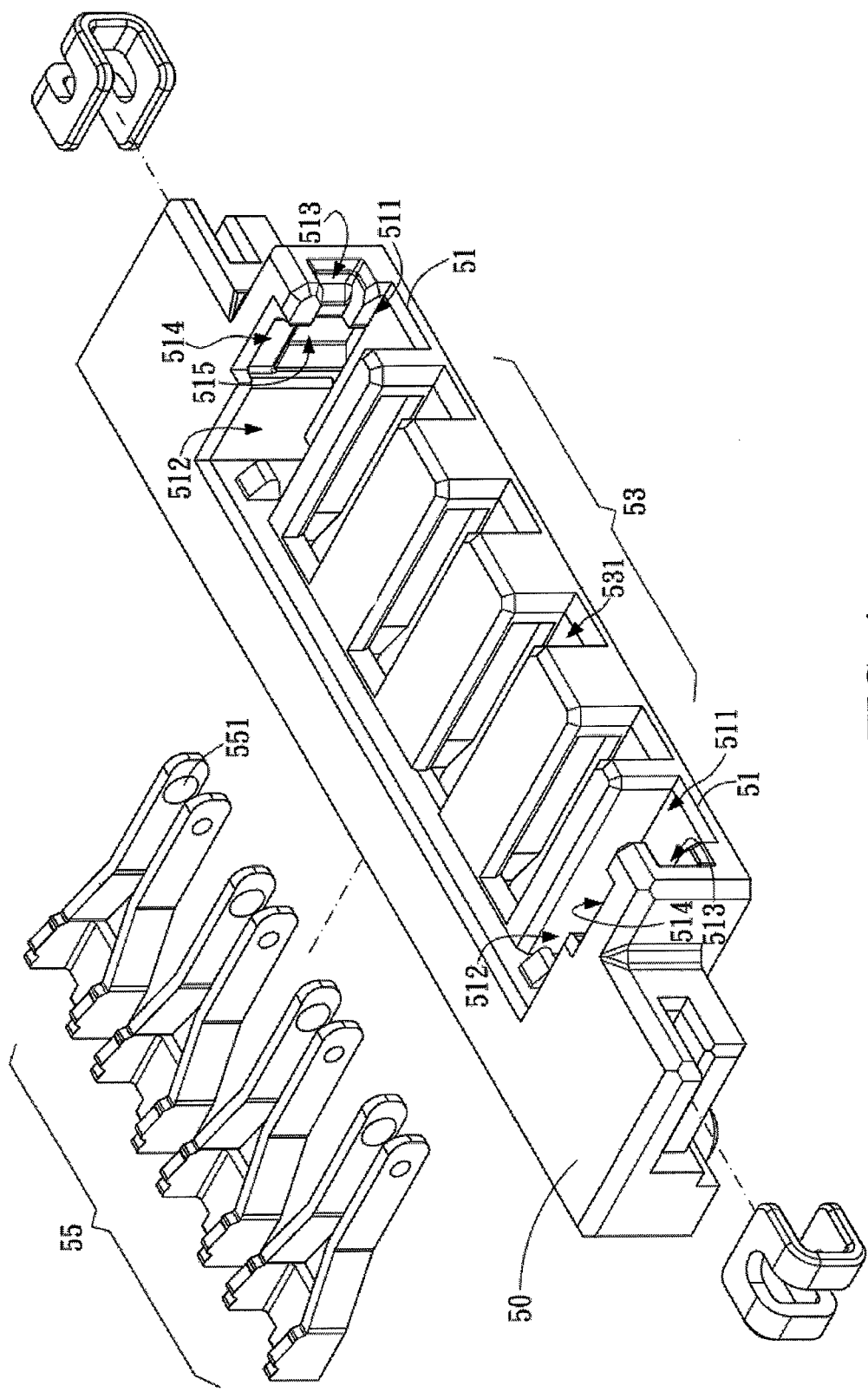
FIG. 4 is a first schematic view of an electric connector according to the present disclosure.
Figure 5:
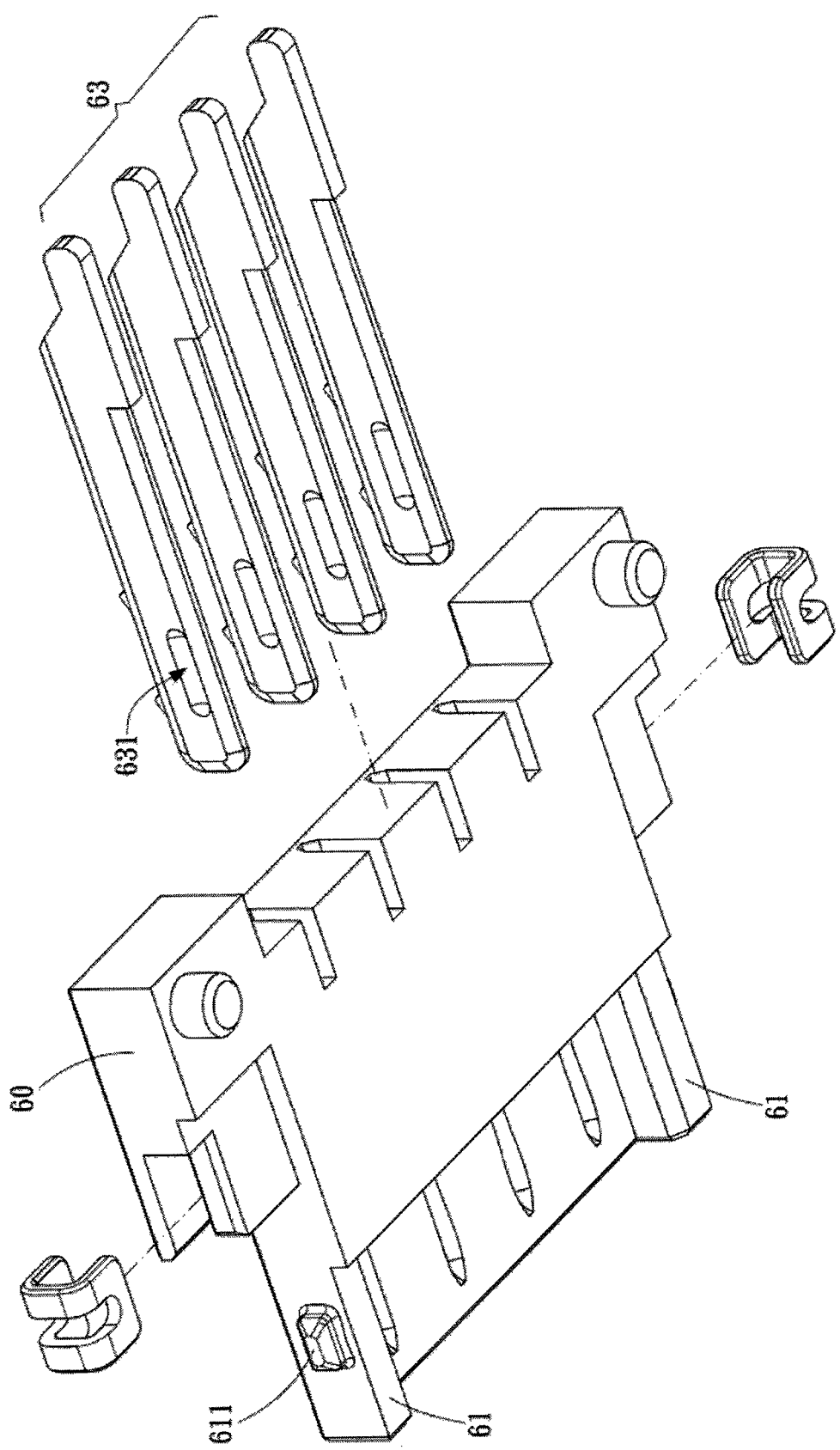
FIG. 5 is a second schematic view of an electric connector according to the present disclosure.

Please refer to FIG. 1 to FIG. 3, respectively a first schematic view, a second schematic view, and a third schematic view of a first embodiment of the present disclosure, in which a thin battery 1 is disclosed. The thin battery 1 includes a battery cell 17, a circuit board 18, an electric connector 19, and an adhesive tap 21.

The battery cell 17 includes a top sealing area 171, a first electrode bar 173, and a second electrode bar 174. The first electrode bar 173 and the second electrode bar 174 are disposed in the top sealing area 171. The first electrode bar 173 is an anode, and the second electrode bar 174 is a cathode. The circuit board 18 is disposed in the top sealing area 171. The circuit board 18 includes a first electrode welding pad 183 and a second electrode welding pad 184. The electric connector 19 is disposed in the top sealing area 171 and is connected electrically to the circuit board 18. The adhesive tape 21 is provided with an opening 211. The adhesive tape 21 wraps the battery cell 17 and the circuit board 18 such that the electric connector 19 is exposed from the opening 211. The first electrode bar 173 is welded on the first electrode welding pad 183, and the second electrode bar 174 is welded on the second electrode welding pad 184.

In an implementation manner, the first electrode welding pad 183 includes a first part 183A and a second part 183B. The first part 183A is folded toward the second part 183B, so that the first part 183A and the second part 183B are spaced by a first gap 183C. Similarly, the second electrode welding pad 184 includes a first part 184A and a second part 184B. The first part 184A is folded toward the second part 184B, so that the first part 184A and the second part 184B are spaced by a second gap 184C. The first electrode bar 173 is inserted to the first gap 183C, and the second electrode bar 174 is inserted to the second gap 184C. In this manner, the circuit board 18 is generally fixed on the top sealing area 171 of the battery cell 17. Then, through spot welding, the first electrode bar 173 is welded on the first electrode welding pad 183 and the second electrode bar 174 is welded on the second electrode welding pad 184.

Please refer to FIG. 4 to FIG. 7, respectively a first schematic view of an electric connector, a second schematic view of an electric connector, a schematic view of plugging an electric connector along a first direction, and a schematic view of plugging an electric connector along a second direction according to the present disclosure. In an implementation manner, the electric connector 19 includes a first insulating body 50 and a plurality of conductive terminals 55. The first insulating body 50 includes two positioning slots 51 and a plurality of terminal slots 53. Each positioning slot 51 has a first socket 511 and a second socket 512. A first guide slot 513, a second guide slot 514, and a concave portion 515 are provided on a wall of each positioning slot 51. The first guide slot 513 extends from the first socket 511 to the concave portion 515 along a first direction 80. The second guide slot 514 extends from the second socket 512 to the concave portion 515 along a second direction 90. The terminal slots 53 are arranged between the two positioning slots 51 at intervals. Each terminal slot 53 has a third socket 531 and a fourth socket 532. The plurality of conductive terminals 55 is separately disposed in the terminal slots 53.

Figure 6:
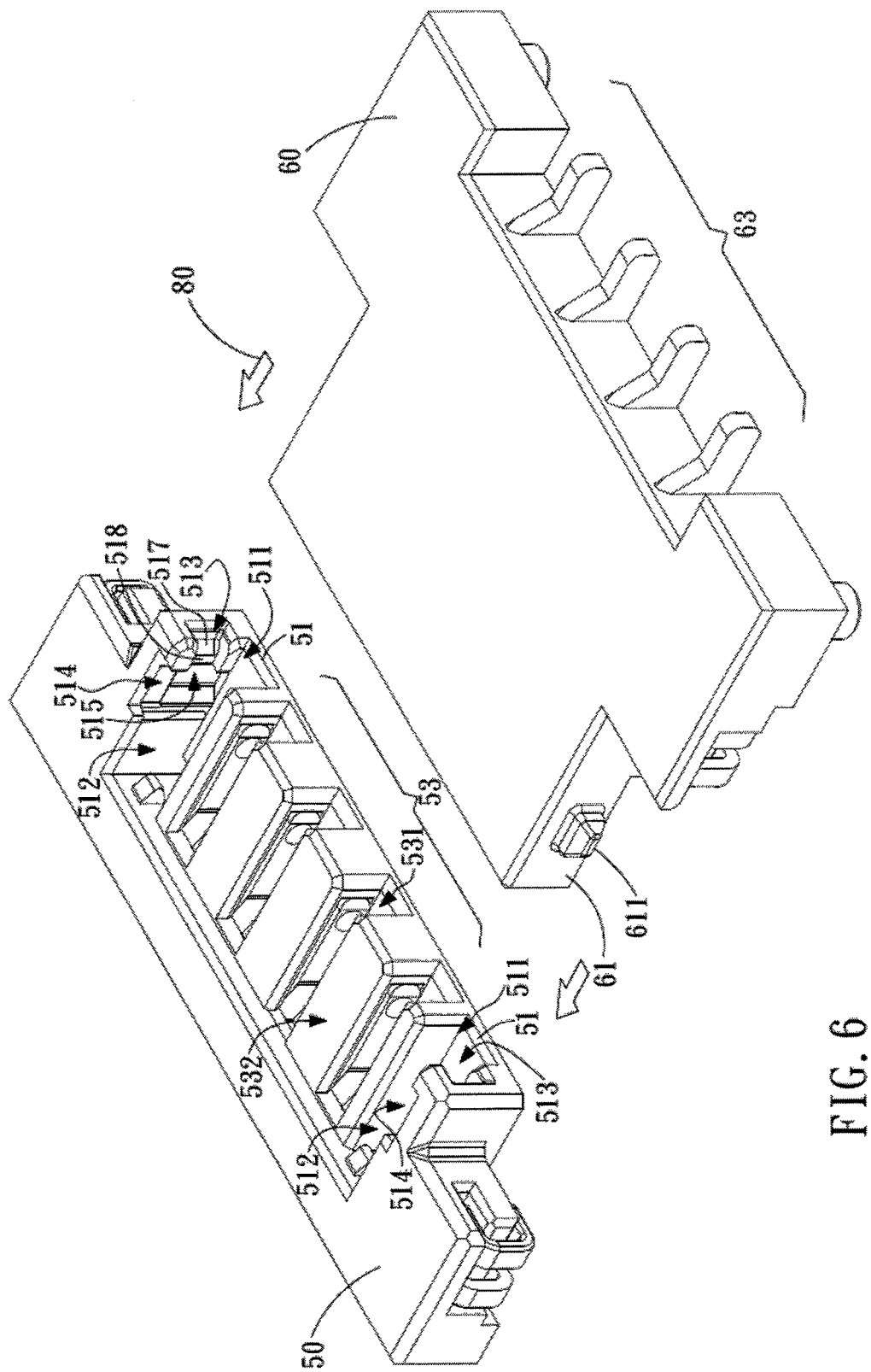
FIG. 6 is a schematic view of plugging an electric connector along a first direction according to the present disclosure.
Figure 7:
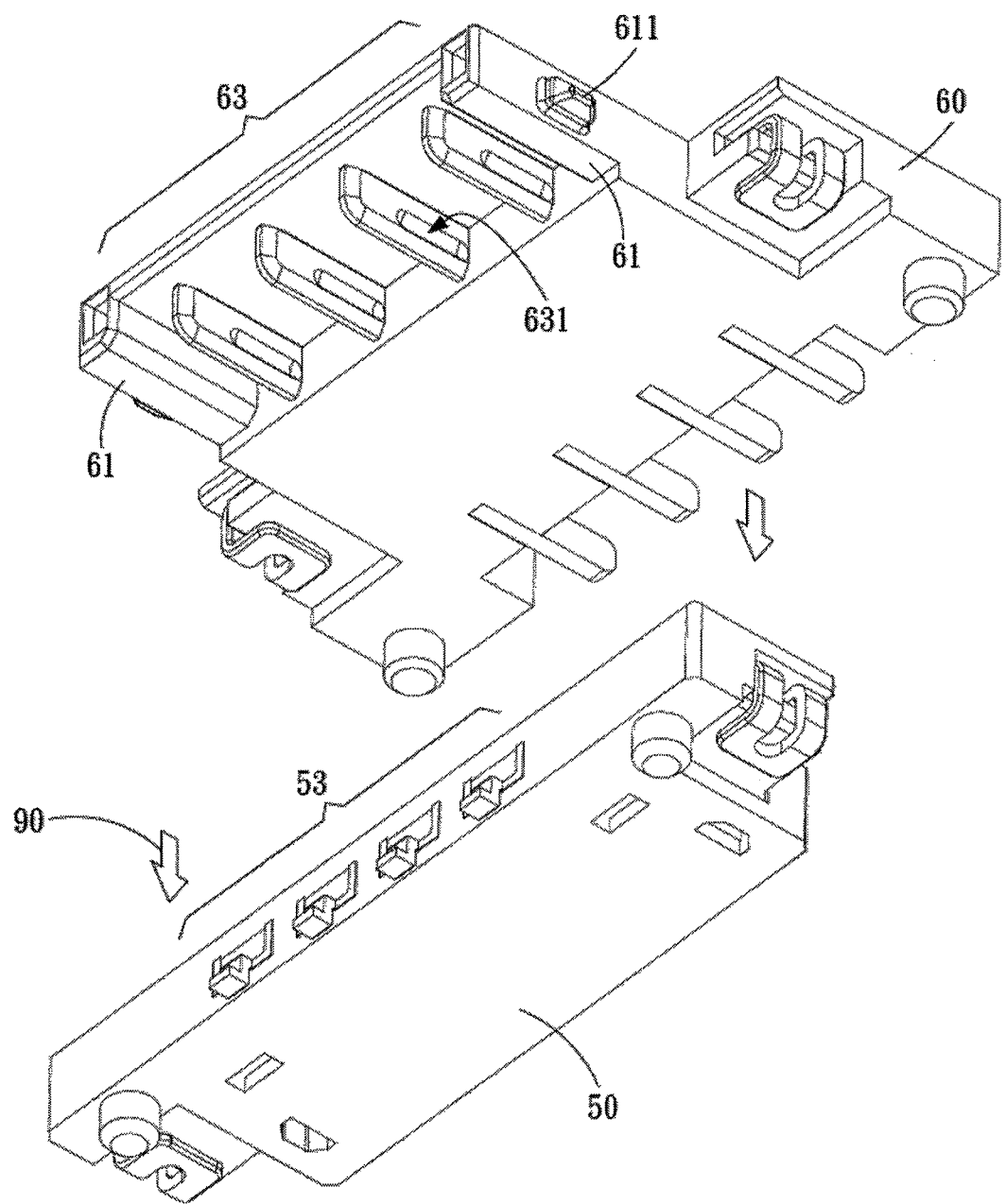
FIG. 7 is a schematic view of plugging an electric connector along a second direction according to the present disclosure.

In addition, the electric connector 19 further includes a second insulating body 60 and a plurality of metal pins 63. Two positioning plates 61 are disposed at two sides of the second insulating body 60, and are correspondingly connected to the two positioning slots 51. Each positioning plate 61 includes a positioning bump 611. The positioning bump 611 is embedded into the concave portion 515 from the first guide slot 511 or from the second guide slot 512 (as shown in FIG. 6), thereby fixing the second insulating body 60 on the first insulating body 50. The plurality of metal pins 63 is disposed between the two positioning plates 61 at intervals. When the positioning bump 611 is embedded into the concave portion 515, the plurality of metal pins 63 is separately inserted to the terminal slots 53 and connected electrically to the conductive terminals 55.

Therefore, as long as the first insulating body 50 and the conductive terminals 55 are disposed in the top sealing area 171, and the second insulating body 60 and the metal pins 63 are disposed on electronic equipment to be connected, the thin battery 1 can be connected to the electronic equipment along the first direction 80 or the second direction 90.

In addition, in an implementation manner, a terminal protruding point 551 is provided on each conductive terminal 55. A terminal chute 631 is provided at an end of each metal pin 63. When the two positioning plates 61 are correspondingly connected to the two positioning slots 51, the terminal protruding point 551 is embedded into the terminal chute 631.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A thin battery, comprising:
    a battery cell, comprising a top sealing area, a first electrode bar, and a second electrode bar, wherein the first electrode bar and the second electrode bar are disposed in the top sealing area;
    a circuit board, disposed in the top sealing area and comprising a first electrode welding pad and a second electrode welding pad;
    an electric connector, disposed in the top sealing area and connected electrically to the circuit board, the electric connector comprising:
        a first insulating body, comprising two positioning slots and a plurality of terminal slots, wherein each positioning slot a first socket and a second socket a first guide slot, a second guide slot and a concave portion are provided on a wall of each positioning slot; the first guide slot extends from the first socket to the concave portion along a first direction; the second guide slot extends from the second socket to the concave portion along a second direction; the terminal slots are arranged between the two positioning slots at intervals, and each terminal slot has a third socket and a fourth socket; and
        a plurality of conductive terminals, separately disposed in the terminal slots; and
    an adhesive tape, having an opening, wherein the adhesive tape wraps the battery cell and the circuit board such that the electric connector is exposed from the opening,
    wherein the first electrode bar is welded on the first electrode welding pad, and the second electrode bar is welded on the second electrode welding pad.

2. The thin battery according to claim 1, wherein the first electrode welding pad comprises a first part and a second part opposite the first part; the first part and the second part of the first electrode welding pad are spaced by a first gap.

3. The thin battery according to claim 2, wherein the second electrode welding pad comprises a first part and a second part opposite the first part; the first part and the second part of the second electrode welding pad are spaced by a second gap.

4. The thin battery according to claim 3, wherein the first electrode bar is inserted to the first gap.

5. The thin battery according to claim 4, wherein the second electrode bar is inserted to the second gap.

6. The thin battery according to claim 1, wherein the electric connector comprises:
    a second insulating body, comprising two positioning plates correspondingly connected to the two positioning slots, wherein each positioning plate comprises a positioning bump; the positioning bump is embedded into the concave portion through the first guide slot or the second guide slot, to fix the second insulating body on the first insulating body; and
    a plurality of metal pins, disposed between the two positioning plates at intervals, wherein when the positioning bump is embedded into the concave portion, the metal pins are separately inserted to the terminal slots and connected electrically to the conductive terminals.

7. The thin battery according to claim 1, wherein a terminal protruding point is provided at an end of each conductive terminal.

8. The thin battery according to claim 1, wherein in the electric connector, a terminal chute is provided at an end of each metal pin, when the two positioning plates are correspondingly connected to the two positioning slots, the terminal protruding point is embedded into the terminal chute.

* * * * *